H. E. VAN DORN.
COMBINED CAR AND AIR COUPLING.
APPLICATION FILED AUG. 13, 1919.

1,403,657.

Patented Jan. 17, 1922.
6 SHEETS—SHEET 4.

Inventor:
H. E. Van Dorn,
By Chamberlin & Freudenreich
Attys.

H. E. VAN DORN.
COMBINED CAR AND AIR COUPLING.
APPLICATION FILED AUG. 13, 1919.

1,403,657.

Patented Jan. 17, 1922.
6 SHEETS—SHEET 6.

Inventor:
H. E. Van Dorn,
By Chamberlin & Freudenreich
Attys

UNITED STATES PATENT OFFICE.

HERBERT E. VAN DORN, OF CHICAGO, ILLINOIS.

COMBINED CAR AND AIR COUPLING.

1,403,657.  Specification of Letters Patent.  Patented Jan. 17, 1922.

Application filed August 13, 1919. Serial No. 317,111.

*To all whom it may concern:*

Be it known that I, HERBERT E. VAN DORN, a citizen of the United States, residing at Chicago, county of Cook, State of Illinois, have invented a certain new and useful Improvement in Combined Car and Air Couplings, and declare the following to be a full, clear, and exact description of the same, such as will enable others skilled in the art to which it pertains to make and use the same, reference being had to the accompanying drawings, which form a part of this specification.

The present invention has for its object to produce a novel coupling mechanism for simultaneously connecting together two vehicles and at the same time forming a coupling between fluid conduits carried by said vehicles, which shall be simple in construction, strong and durable, and efficient and reliable in operation.

A further object of the present invention is to produce a simple and novel combined vehicle and air coupler which shall automatically open and close the air conduits on their respective vehicles, in coupling and uncoupling in the normal way, and which will leave the conduits open to atmosphere in case an uncoupling is effected through the breaking of a part of a coupler, whereby an automatic application of the airbrakes may result where the conduits are part of an airbrake system.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 3ᴬ is a side elevation of the rear end of one of the couplers.

Referring to the drawing, 1 represents a hollow coupler head of any usual or suitable construction except as may hereinafter be indicated. The chamber, 2, within the interior of the head opens out of the front end of the latter. At one side of the head is a forwardly-projecting hook, 3, rigid with and preferably integral with the head. The point or nose of the hook is wedge shaped as viewed in plan, having vertical inner and outer faces, 4 and 5, respectively arranged at an angle to each other. At the inner or rear end of the face 4 is a vertical face, 6, parallel with the face 5. A wall, 7, extends approximately at right angles to the face 6 from the inner rear end of the latter, this wall terminating at its rear inner end within the chamber 2 and there having an edge or face, 8, which is parallel with the faces 5 and 6. The chamber 2 is bounded, at the extreme front edge on the side opposite that on which the hook is located, by a surface or face, 9, parallel with the faces 5, 6 and 8. The hook is further provided with a flat approximately vertical face, 10, on the outer side just in front of the horizontal plane containing the front edge of the bell-shaped portion of the head, this face being parallel with the faces 8 and 9.

Figure 1:
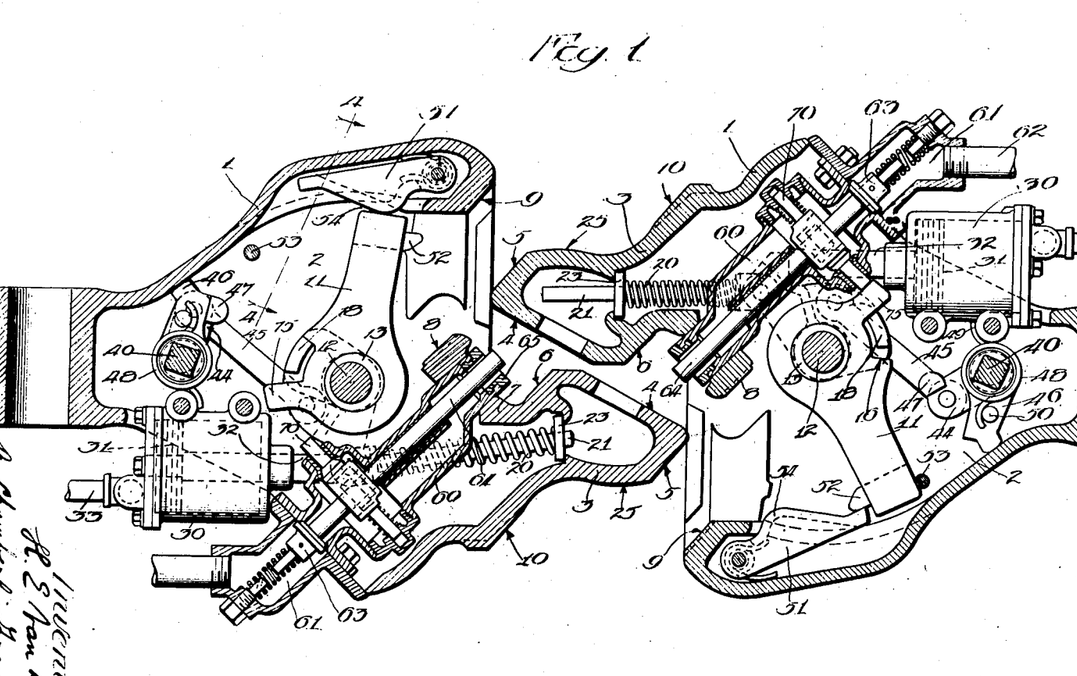
Figure 1 is a horizontal section through two coupler heads constructed in accordance with the preferred form of the present invention, ready to couple, the left hand coupler head showing the locking dog or bail in one of the several positions which it may occupy, while the right hand coupler head shows the same part in another of its positions.
Figure 2:
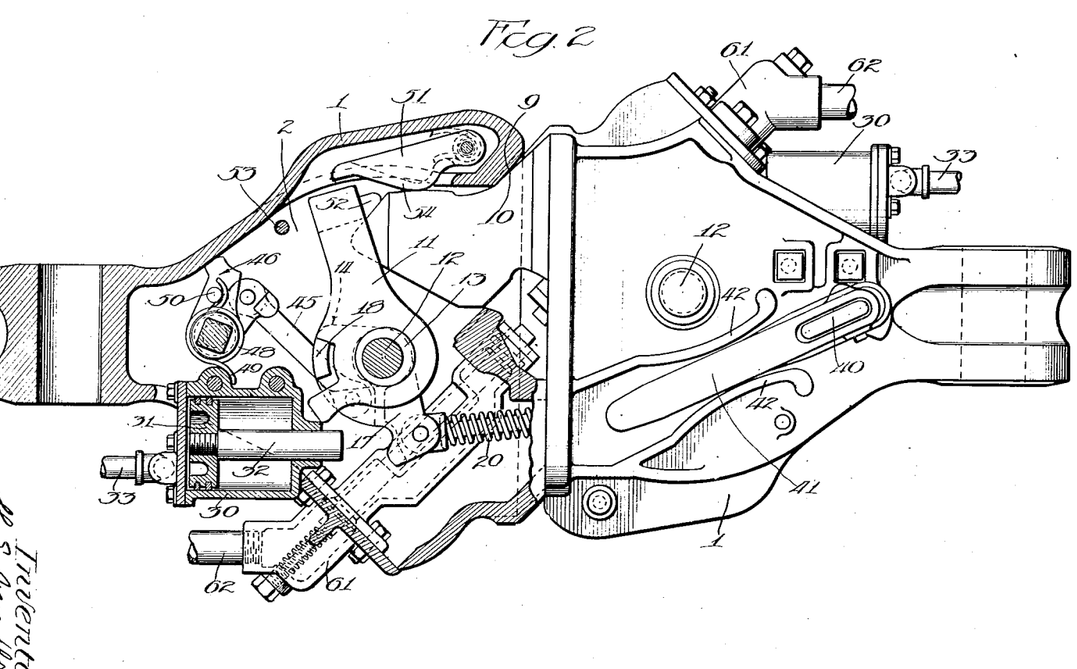
Fig. 2 is a view showing the two coupler heads partially coupled, one of the heads being in horizontal section as in Fig. 1, and the other being shown in plan.
Figures 3, 3A:
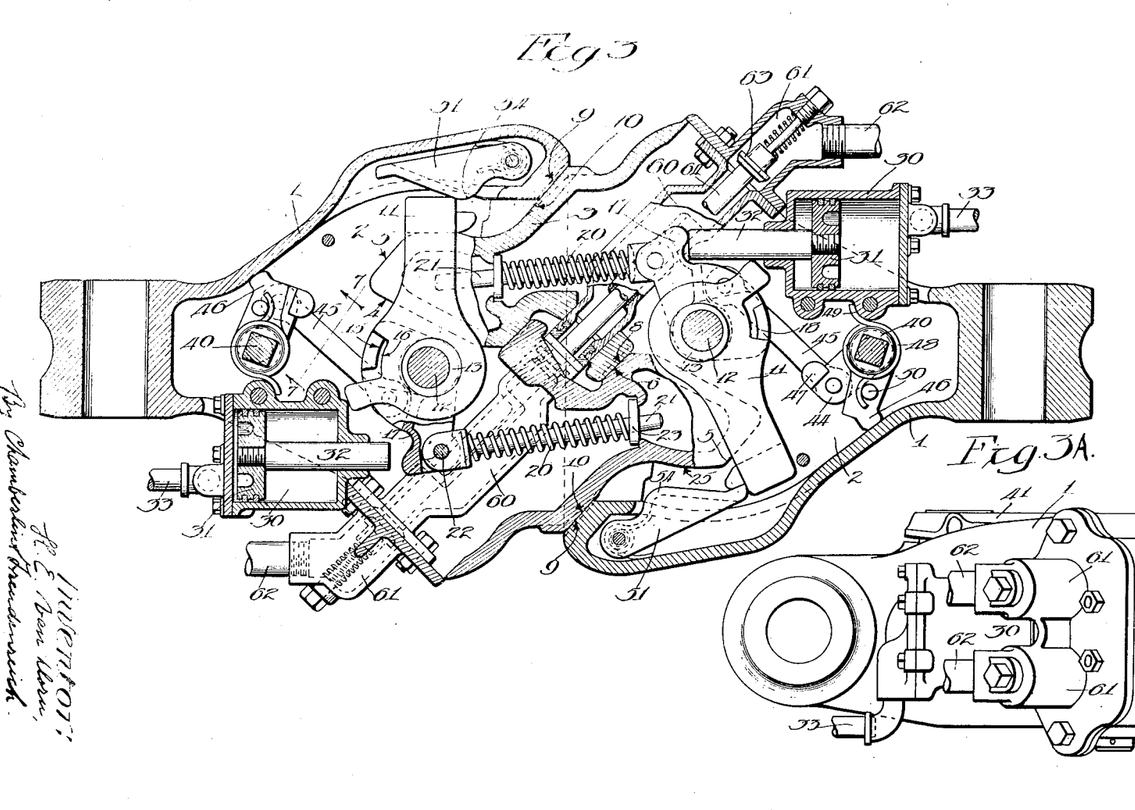
Fig. 3 is a view similar to Fig. 1, showing the coupler heads fully interlocked in their coupled relation, the locking dog in the left hand coupler being in its locking position while the locking dog in the right hand head is set in its release position.

When a coupling is to be made, two heads approach each other as illustrated in Fig. 1 and either the face 4 on one of the hooks lies opposite that portion of the wall, 7, on the opposite head which forms the front edge of the face 8, or else the face 5 on the first head engages the face 9 on the other, so that the hook of one head is guided into the chamber of the other as illustrated in Fig. 2. When the positions illustrated in Fig. 2 are reached, each of the faces 9 at the entrance to the chambers in the heads acts upon the outer beveled face, 10, on the opposite hook, producing a lateral bodily shifting of the coupler heads so as to cause the face 6 of one hook to slide along the face 8 of the other until the positions illustrated in Fig. 3 are reached. Each hook now engages with the opposite hook at two points and also engages with the flaring face or wall at the mouth of the chamber in the opposed head. By providing a suitable locking dog the hooks may be positively held together in their interlocked position and, when desired, be allowed to withdraw from each other by a reverse operation from that heretofore described, when released from the locking devices.

Figure 4:
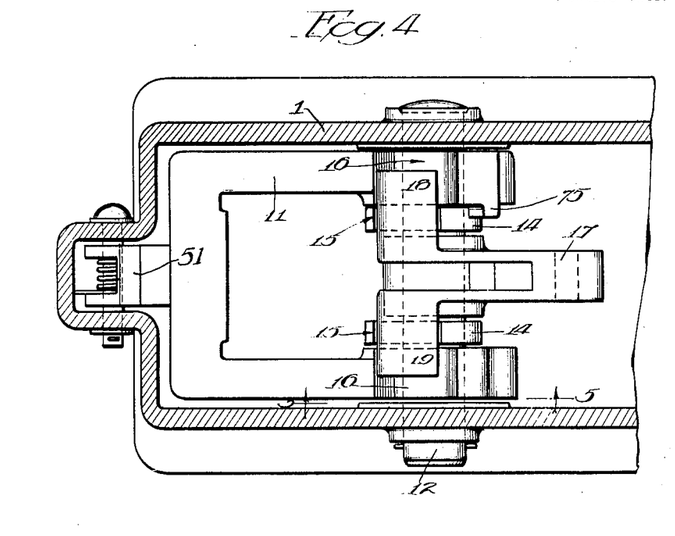
Fig. 4 is a section on a somewhat enlarged scale taken approximately on line 4—4 of Fig. 1, and illustrating only the locking dog or bail, the immediate controlling elements therefor, and the corresponding portion of the coupler head.
Figure 5:
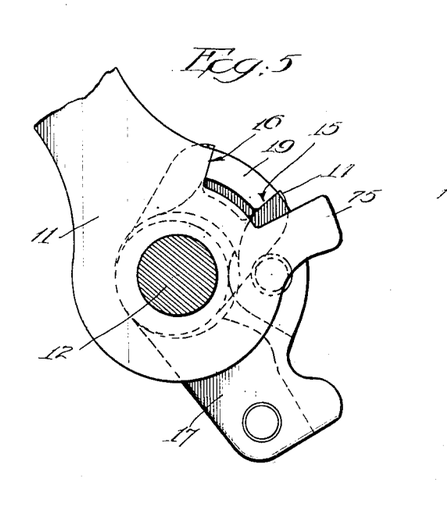
Fig. 5 is a section taken approximately on line 5—5 of Fig. 4, looking in the direction of the arrows, only a fragment of the locking dog or bail being shown.
Figure 6:
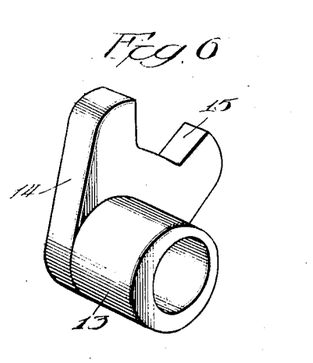
Fig. 6 is a perspective view of one of the pressure-releasing eccentrics forming the pivotal supports for the locking dog or bail.
Figure 7:
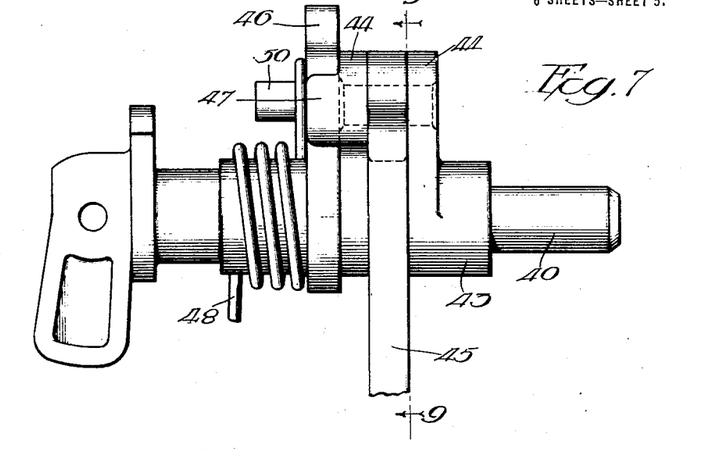
Fig. 7 is a side elevation of the locking and unlocking shaft adapted for manual operation, being a view approximately on line 7—7 of Fig. 3, looking in the direction of the arrows and being on a much larger scale than Fig. 3.
Figure 8:
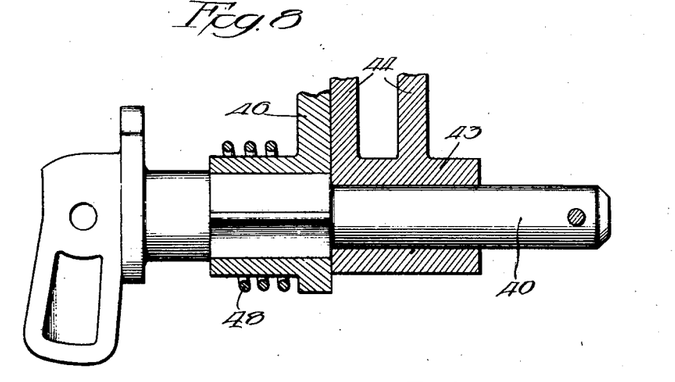
Fig. 8 is a view similar to Fig. 7, parts of the operating mechanism being shown in section.
Figure 9:
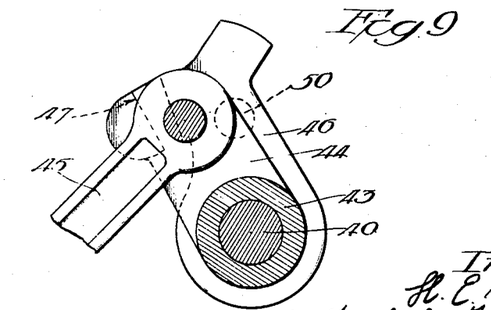
Fig. 9 is a section taken approximately on line 9—9 of Fig. 7.

The locking device is in the form of a bail, 11, swinging about a vertical axis passing through the free ends of its arms. As best shown in the first six figures of the drawings, there is a vertical pin, 12, extending through the coupler head and the arms of the bail somewhat in rear of the inner end of the hook. The bail is not journaled directly on this pin but there is interposed between each arm of the bail and the pin an eccentric sleeve or bushing, 13. By turning the eccentric sleeves without simultaneously turning the locking bail, the bail as a whole is shifted radially in the direction of its length. Thus when the bail is in its locking position as illustrated in the left hand coupler of Fig. 3, if the eccentrics are turned slightly in the counter-clockwise direction, the holding pressure of the bail on the hook of the opposite coupler head is released, and then the bail may be swung freely out of the way. Each of the eccentric sleeves is provided at one end, namely that end which is at the top in the lower arm of the bail and that end which is at the bottom in the upper arm of the bail, with a laterally-projecting flange, 14, having in the outer edge a notch, 15. The overlying portions of the arms of the bail are provided with notches, 16, registering with the notches 15, but somewhat greater in angular length. Journaled on the pin 12 and lying between the flanges of the eccentric bushings so as to serve as a spacer between the same is an actuating plate, 17, having arms, 18 and 19, projecting upwardly and downwardly therefrom; the arm 18 being so located and of such length that it extends up through the notch 15 in the flange of the upper eccentric bushing or sleeve and into the notch 16 in the upper arm of the bail, while the arm 19 is similarly located relatively to the lower eccentric bushing member and the lower arm of the bail. The members 18 and 19, as will best be seen in Fig. 4, are wide enough to fill the notches 15 but are narrower than the angular width or length of the notches 16 in the bail. The result is that when the member 17 is turned on the supporting pin 12 it may turn the eccentric sleeves through a small angle before the members 18 and 19 contact with the bounding walls on one side of the notches in the arms of the bail. In other words, by properly proportioning and locating the parts, the holding pressure between the bail and the coupling hook with which it co-operates may be released at the beginning of an actuating movement of the member 17 and, when such pressure has been released, the member 17 will act directly upon the bail to swing it back out of the way. On the return movement of the actuating member 17, the eccentric members are first turned so as to take up the slack or shorten the effective length of the bail, before the bail is swung into its locking position. There is a spring, 20, acting constantly on the actuating member 17 in the direction to swing the locking bail to and even beyond its locking position. For convenience, the spring may be placed loosely around a rod, 21, pivotally connected at one end, as at 22, to the actuating member 17, and passing at its other end through a suitable guiding support, 23. The left hand coupler in Fig. 3 shows the normal locking position of the bail while the left hand coupler in Fig. 1 illustrates how the bail is swung past such locking position when there is no co-operating coupler hook to be engaged thereby. I make use of this added range of movement of the bail beyond the normal locking point to compensate for wear in the couplers and thus insure intimate contact between the working faces of two co-operating couplers even after they have become considerably worn. The vertical member of the bail engages with the hook of the opposed coupler along a surface, 25, which is located just behind the face 5 at the nose of the hook. This surface, 25, is so disposed that a wedging action is produced between it and the vertical element of the bail when the latter is swung into locking position. As wear occurs between the various working faces of the couplers, the bails simply swing a little farther around onto the co-operating hooks and thus keep the working faces of the couplers in contact with each other.

In the arrangement shown, the unlocking of the coupler may be brought about in two ways, either by a suitable pneumatic device or by a manually operated device. For pneumatic operation there is mounted on the coupler head, in rear of the hook, a cylinder, 30, within which is a piston, 31, having a rod, 32, which enters the chamber in the head in rear of the actuating member 17. When air is admitted into the cylinder behind the piston through a suitable pipe 33, the piston is driven forward and the rod or stem engages with the actuating member 17 as shown in the right hand coupler in Fig. 3, and the locking bail is swung back into its release position. For manual operation, any suitable device may be employed, but it should be so designed that it will not interfere with nor be interfered with by the pneumatic device. In the arrangement shown, as best illustrated in Figs. 1 to 3 and 7 to 9, there is a vertical pin, 40, rotatably mounted in the rear end of the coupler head and having on its upper end, above the coupler head, an actuating handle, 41. As will best be seen in Fig. 2, the actuating handle when in its position of rest lies between a pair of ribs, 42, 42, formed on the upper side of the coupler head and serving to hold the pin 40 against rotation until the actuating lever 41 is lifted high enough to clear the ribs. Within the coupler head, and revoluble upon the pin, is a sleeve, 43, provided with radially-projecting arms, 44. A connecting rod, 45, extends at one end between and is pivotally connected to the arms 44 and at its other end is connected to the actuator 17. The pin 40 is provided with a radially-projecting arm, 46, fixed thereto so as to rotate therewith. This arm lies in the same horizontal plane as a finger, 47, projecting upwardly from one of the arms 44. Consequently, when the pin 40 is turned in one direction the arm 46 engages the finger 47 and, acting through the arms 44 and connecting rod 45, moves the actuator for the locking bail. However, when the actuator is acted upon by the pneumatic device, the part 43 with its arms 44 turns freely on the pin 40 without affecting the latter. The pin 40 with its projecting arm, 46, is normally held in the proper angular position, which it must occupy when the locking bail is in its locking position, by means of a spring, 48, surrounding the pin and engaging at one end, as indicated at 49, with a stationary part of the coupler head and at its other end with a projection, 50, on the arm 46.

It is of course desirable that means be provided for retaining the locking bail in its release position after it has once been brought into that position and until the uncoupling has been effected. To this end I have placed inside of the coupler head, in the vicinity of the swinging end of the bail, a spring-actuated pawl, 51, which, when the bail is swung back in its release position, drops in front of the bail and serves to hold it there; the bail being provided with a projection, 52, on the front side against which the pawl may strike to limit its swinging movement. In order to secure proper co-ordination between the parts, a stop or abutment, 53, is placed behind the swinging bail in such a position that when the bail is swung back either manually or by the pneumatic device, it will be carried back just far enough to permit the pawl to swing freely in front of the bail and against the projection 52. On the inner side of the pawl 51 is a bulge or hump, 54, which is adapted to be engaged by the retreating hook during the uncoupling action, so as to push the pawl laterally and free the bail therefrom. Consequently, at the end of the uncoupling operation, the bail swings forwardly without being interfered with by the pawl. Fig. 2 illustrates the manner in which the pawl is pushed out of the way by the retreating hook during the uncoupling action, while Fig. 1 shows in the left hand coupler the ultimate position of the locking bail after the uncoupling has been completed.

The remaining feature of my invention has to do with the air coupling. There are arranged in the coupler just in rear of the coupling hook two horizontal conduits, 60, one above the other, each chamber opening out through the wall 7 and opening at its opposite end into a chamber, 61, to which a train pipe, 62, or other pipe adapted to carry the air or fluid to be controlled, is connected. The positions of the two sets of air conduits and chambers relatively to each other and to the top and bottom walls of the coupler head are shown in Fig. 3$^A$. In the chamber 61 is a spring-pressed valve, 63, adapted to be held closed by the spring and by pressure within the chamber 61. The valve is carried on the inner end of a long stem, 64, which passes through the conduit 60 and, when the valve is closed, protrudes slightly beyond the wall 7 and a suitable gasket or packing ring, 65, therein. The face of the gasket or packing ring 65 is arranged at right angles to the faces 6 and 8 of the hook and it is so located that when two couplers are coupled together, two packing rings or gaskets will be pressed firmly together and make an airtight joint; thus permitting air, when the valves are open, to flow from the pipe on one car or vehicle through the two coupler heads and to the pipe on the other car or vehicle. By making the rod or valve stem, 64, long enough to cause it to project beyond the corresponding packing ring or gasket, it will be engaged by the corresponding rod or stem of the other coupler when two couplers come together, with the result that both valves or stems will be pushed back and the valves in both couplers be open. As soon as the couplers separate, the valves and the valve stems are returned to the positions illustrated in Fig. 1, so that the air or other fluid will not escape from either train pipe.

Where the air coupling forms part of an automatic air brake system, it is desirable that means be provided for preventing the valves from closing in case two couplers are separated because of the breakage of some part; thus causing the brakes to be applied. The only way in which intentional uncoupling is brought about is through the operation of one or the other of the uncoupling devices heretofore described, by means of which the coupling bail is swung into its release position. Therefore if the closing of the air valves in the couplers, after they have once been opened by a coupling operation, is placed under the control of the locking bails or parts immediately associated therewith, the valves may be prevented from closing except whenever an intentional uncoupling is brought about.

Figure 10:
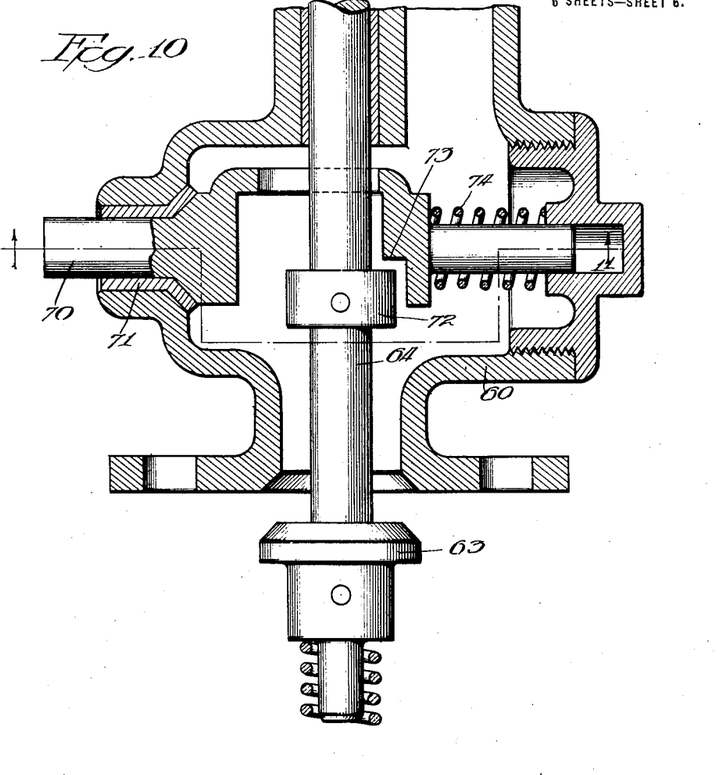
Fig. 10 is a horizontal section on an enlarged scale through a portion of the air coupler mechanism, illustrating the locking means for holding the air valve in the conduit open in case of accidental uncoupling.
Figure 11:
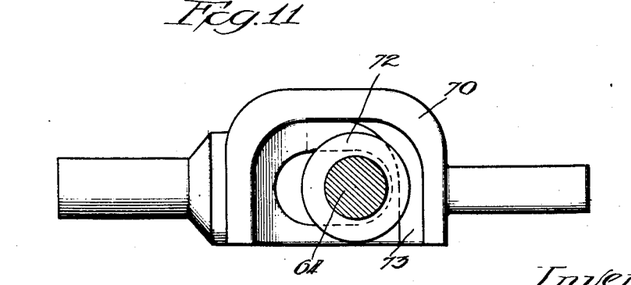
Fig. 11 is a section taken approximately on line 11—11 of Fig. 10.

As best shown in Figs. 1, 10 and 11, there is a slide, 70, mounted in the upper conduit 60 at right angles to the valve stem 64; one end of this slide projecting through a suitably packed opening, 71, in the rear wall of the chamber. On the valve stem is fixed a collar, 72. On the slide 70 is a shoulder, 73, in position to be brought in front of the collar on the valve stem when the valve is open and prevent the valve stem from moving in the direction to close the valve. A spring, 74, acting on the slide, tends constantly to hold it in such a position that the shoulder 73 will engage the collar on the valve stem and lock the valve open. The parts are so proportioned that the protruding end of the slide is in the path of movement of a finger, 75, on the upper arm of the locking bail. When the locking bail is swung back into its release position, the finger 75 engages with the protruding end of the slide and moves the latter in the direction to carry the shoulder 73 out of the path of travel of the collar on the valve stem, such a condition being illustrated in the right-hand coupler in Fig. 1. It will be seen from an inspection of the right-hand coupler in Fig. 3 that the hook on the opposite coupler must be retracted or withdrawn for a considerable distance before it trips the member 51 which holds the locking bail in its release position; namely, a distance greater than the collar 72 must travel in order to pass beyond the shoulder 73. Consequently the valve will be made ready to close before the locking bail is permitted to swing forward from the position in which the finger 75 engages with the slide to hold the latter in its release position. Therefore, when the couplers separate in the normal way, the valve stems are allowed to move freely in the direction to close the valves; but, in case an uncoupling should be brought about because of the accidental breaking of a hook or a locking bail, no preliminary shifting of the slides having taken place, the valves will be prevented from closing and therefore the air brakes would be applied automatically because of a discharge of the air from the train pipe. Furthermore, in case a locking bail should accidentally slip back far enough to release a hook with which it has been engaged, the spring 20 would be compressed and offer sufficient resistance to the movement of the bail to prevent it from swinging back far enough to operate the corresponding slide and therefore, in this instance also, the brakes would be automatically applied at the instant of uncoupling.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A combined car and air coupler having an air conduit, a movable coupler lock, actuating means for said lock, a valve associated with said conduit, and a controlling element for said valve in position to be actuated directly by said lock when the latter is moved into a release position.

2. A combined car and air coupler having an air conduit, a coupler lock movably mounted in the coupler and adapted to engage a part on another coupler to lock the two couplers together, a valve associated with said conduit, and a controlling element for said valve adapted to be directly engaged and actuated by said lock when the latter is moved into a release position.

3. A combined car and air coupler having an air conduit, a coupler lock movable from a locking position to a release position, actuating means for said lock, a valve associated with said conduit, and a controlling element for said valve in position to be engaged and actuated directly by said lock when the latter is moved into its release position.

4. A combined car and air coupler having an air conduit, a coupler lock movable from a locking position to a release position, actuating means for said lock, and a valve associated with said conduit and having a part adapted to be engaged directly by said lock when the latter is moved into its release position and cause the valve to be closed.

5. A combined car and air coupler containing a lock and an air conduit, a valve in said conduit having a stem adapted to be engaged by a part of a co-operating coupler to open the valve, a catch for holding the valve open, and means for tripping the catch when said lock is moved into its release position.

6. A combined car and air coupler containing a lock and an air conduit, a valve in said conduit having a stem adapted to be engaged by a part of a co-operating coupler to open the valve, a catch for holding the valve open, and a part associated with said lock adapted to engage with said catch and move it out of operative relation to said stem when said lock is moved into its release position.

7. A coupler comprising a chambered head open at the front end and having a forwardly-projecting hook at one side, and a vertically-arranged swinging bail arranged within the head in position to embrace the hook on a co-operating coupler and hold the two hooks against relative lateral displacement.

8. A coupler comprising a chambered head open at the front end and having a forwardly-projecting hook at one side, a vertically-arranged swinging bail located within the head in position to embrace the hook on a co-operating coupler and hold the two hooks against relative lateral displacement, means for swinging said bail into a release position, and a spring-actuated catch in position to engage said bail to hold it in its release position.

9. A coupler comprising a chambered head open at the front end and having a forwardly-projecting hook at one side, a vertically-arranged swinging bail located within the head in position to embrace the hook on a co-operating coupler and hold the two hooks against relative lateral displacement, means for swinging said bail into a release position, and a spring-actuated catch in position to engage said bail to hold it in its release position, said catch having a cam-shaped part in position to be engaged by the hook on a co-operating coupler to trip the same.

10. A coupler comprising a chambered head open at the front end and having a forwardly-projecting hook at one side, a bail extending transversely across the interior of the head, the closed end of the bail being on the side remote from said hook, means for supporting the free ends of the bail so as to permit the bail to swing about a vertical axis, a spring tending to swing the closed end of said bail in the forward direction, and said hook having on the outer side a cam surface adapted to engage the bail in a co-operating coupler in a wedging fashion when the hook is inserted in the latter bail.

11. A coupler comprising a chambered head open at the front end and having a forwardly-projecting hook at one side, the said hook having on the inner side a transverse face or shoulder adapted to be engaged with a co-operating face or shoulder on another hook by a relative lateral movement, a bail extending transversely of said head within the latter and capable of swinging about a vertical axis, said bail being adapted to embrace the hook of another coupler and hold it in engagement with the hook forming part of the coupler in which the bail is mounted, and actuating means for said bail including mechanism for shifting the bail bodily in the lengthwise direction so as to relieve the pressure between it and the hook with which it is engaged and then swinging the bail out of engagement with the hook.

12. In a coupler, a swinging locking bail, a supporting shaft extending through the free ends of the arms of said bail, eccentric sleeves extending through said arms and surrounding said shaft, and an actuating device for said bail connected with said sleeves and having a lost motion connection with said bail so as to permit the sleeves to be turned through a predetermined angle before a turning pressure is exerted on the bail.

In testimony whereof, I sign this specification.

HERBERT E. VAN DORN.